United States Patent
Grevener et al.

(10) Patent No.: US 8,807,631 B2
(45) Date of Patent: Aug. 19, 2014

(54) FLOOR MODULE FOR A MOTOR VEHICLE WITH A VARIABLE DRIVING CONCEPT

(75) Inventors: Christoph Grevener, Gechingen (DE);
Uwe Habisreitinger, Freudenstadt (DE);
Andreas Krevet, Ehningen (DE);
Matthias Mueller, Altensteig (DE);
Thomas Stark, Tuebingen (DE);
Konrad Wirth, Tiefenbronn (DE);
Michael Zuern, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/996,924

(22) PCT Filed: Oct. 27, 2011

(86) PCT No.: PCT/EP2011/005427
§ 371 (c)(1),
(2), (4) Date: Sep. 3, 2013

(87) PCT Pub. No.: WO2012/084083
PCT Pub. Date: Jun. 28, 2012

(65) Prior Publication Data
US 2013/0334839 A1    Dec. 19, 2013

(30) Foreign Application Priority Data
Dec. 23, 2010    (DE) .......................... 10 2010 055 942

(51) Int. Cl.
*B62D 33/00* (2006.01)
*B62D 65/04* (2006.01)
*B62D 25/20* (2006.01)
*B62D 63/02* (2006.01)
*B62D 65/02* (2006.01)

(52) U.S. Cl.
CPC ................ *B62D 25/20* (2013.01); *B62D 65/04* (2013.01); *B62D 63/025* (2013.01); *B62D 65/02* (2013.01); *B62D 25/2009* (2013.01)
USPC .................... 296/181.1; 296/193.07; 296/204

(58) Field of Classification Search
USPC ......... 296/181.1, 181.2, 191, 193.05, 193.07, 296/204; 29/897.2
See application file for complete search history.

(56) References Cited

U.S. PATENT DOCUMENTS 2,254,458 A * 9/1941 Swallow ........................ 296/191
4,730,870 A    3/1988 DeRees
(Continued)

FOREIGN PATENT DOCUMENTS

DE        37 07 684 A1    9/1987
DE    10 2007 047 037 A1    4/2009
(Continued)

OTHER PUBLICATIONS

International Search Report (PCT/ISA/210) dated Jan. 5, 2012 w/ partial English translation (six (6) pages).
(Continued)

Primary Examiner — Lori Lyjak
(74) Attorney, Agent, or Firm — Crowell & Moring LLP (57) ABSTRACT

A floor module for a motor vehicle includes a floor shell, which can be fastened to a shell of the motor vehicle, and equipment with a plurality of variant-specific constructional units arranged on the floor shell. A method for assembling a floor module involves equipping a respective shell of the motor vehicle with a floor module with corresponding chassis and drive train.

10 Claims, 6 Drawing Sheets

(56) References Cited

U.S. PATENT DOCUMENTS

| | | | |
|---|---|---|---|
| 5,688,021 A * | 11/1997 | Tomforde et al. | 296/203.01 |
| 5,934,745 A * | 8/1999 | Moore et al. | 296/193.04 |
| 8,550,544 B2 * | 10/2013 | Auer | 296/191 |
| 2001/0028179 A1 * | 10/2001 | Takemoto et al. | 296/204 |

FOREIGN PATENT DOCUMENTS

| | | |
|---|---|---|
| EP | 0 142 581 A1 | 5/1985 |
| EP | 0 171 576 A1 | 2/1986 |
| EP | 1 839 926 A1 | 10/2007 |
| FR | 2 621 550 A1 | 4/1989 |

OTHER PUBLICATIONS

German-language Written Opinion (PCT/ISA/237) dated Jan. 5, 2012 (six (6) pages).

* cited by examiner

FLOOR MODULE FOR A MOTOR VEHICLE WITH A VARIABLE DRIVING CONCEPT

BACKGROUND AND SUMMARY OF THE INVENTION

Exemplary embodiments of the present invention relate to a floor module for a motor vehicle according, a method for assembling such a floor module, and a method for assembling motor vehicles.

European patent document EP 0 171 576 A1 discloses a floor module, wherein a floor shell is provided, which is designed as a frame-like chassis and, as well as a drive unit with respective chassis elements, also supports corresponding seating units. A non-load-bearing structure is applied to this frame-like or load-bearing floor module.

Furthermore, German patent document DE 10 2007 047 037 A1 discloses a motor vehicle body, wherein the rear section of the body is configured in such a way that one or more cross-members with structural units arranged modularly thereon can be incorporated into the body according to the currently desired equipment.

Furthermore, European patent document EP 1 839 926 A1 discloses a method for assembling a motor vehicle, wherein two variants of a part of a floor of the body can alternatively be assembled, and a spare wheel recess is pre-assembled on the one variant and a gas cylinder is pre-assembled on the other.

Furthermore, German patent document DE 37 07 684 A1 discloses a module construction for a vehicle having several individual modules, wherein a base platform is used as a module. Here, the vehicle only has the desired properties for a vehicle body, such as crash resistance and carrying capacity, after assembly, since each individual module contributes to the carrying capacity of the entire vehicle.

In the series vehicle construction of personal motor vehicles to date, it has furthermore been typical to add an interior installation to the complete shell of the motor vehicle after the shell has been produced. In parallel with this final assembly of the interior installation, which is carried out in a main assembly line, a pre-assembly of the chassis and drive typically takes place in the main assembly line, wherein these components are typically assembled and transported on a driverless transport system. After the respective shell of the personal motor vehicle has been completely equipped with the interior installation in the main assembly line or final assembly, the so-called "marriage" now typically takes place, wherein the shell of the motor vehicle is connected to the corresponding chassis and drive train.

However, currently, a further problem arises, to the effect that each vehicle is produced in a plurality of variants, in particular depending on a respective drive concept of the motor vehicle. Due to the assembly sequence that has to date been typical, these variants have considerable effects on the main assembly line, such that these are currently extremely complex and cost-intensive.

Exemplary embodiments of the present invention are directed to a floor module, a method for assembling such a floor module, as well as a method for assembling motor vehicles, by means of which the production of the motor vehicles is simplified, in particular in the main assembly line.

In order to create a floor module of the type cited above, by means of which the production of motor vehicles is considerably reduced, in particular in the main assembly line, provision is made according to the invention for the floor module to be configured in such a way that the shell also forms a self-supporting body without the floor shell, and that a plurality of constructional units are arranged on the floor shell depending on a drive concept of the corresponding motor vehicle.

Individual components or even modules are understood to be such constructional units. It is possible to add, for example, heat shields, hydraulic lines or fuel lines, which are necessary on the underside of the respective floor shell depending on the respective variant of the motor vehicle, in particular the corresponding drive concept.

Drive concepts are to be understood as various drive systems for the motor vehicle, which use different energy sources, for example, combustion engines, gas engines, electric engines, fuel cell drives or hybrid drives. Air lines, electrical lines such as the main cable harness, or respective energy storage devices such as batteries, tanks or the like can, for example, be arranged on the upper side of the floor shell. Likewise, control devices can, for example, be fastened to the floor shell.

Since, according to the invention, a separate floor module is provided, which, for example, is connected to the actual shell or the remaining shell of the motor vehicle only during the marriage, this floor shell can be equipped with variant-specific constructional units in a particularly advantageous manner. These constructional units can thus be applied to the floor module in a pre-assembly in a simple manner, in particular depending on the drive concept of the motor vehicle, for example. Thus, these expensive assembly operations can be carried out outside the main assembly line in a pre-assembly, whereby the main assembly line and main line are considerably simplified and streamlined. Furthermore, by contrast to the concepts known from the prior art, it is ensured by the selection of the floor shell according to the invention that the body is self-supporting without the floor module, even before it has been assembled, and that all safety-related requirements are fulfilled.

The present floor shell is here preferably designed as a floor plate in the region of the main floor and, if necessary, of the rear part, which can be introduced into a recess provided for this within the self-supporting structure or shell of the motor vehicle.

In a further embodiment of the invention, it has been shown to be advantageous if, in particular, a plurality of constructional units, which are arranged on the floor shell, are configured according to a drive concept of the corresponding motor vehicle. The respective drive concept requires a plurality of adaptations, for example with respect to respective line relocations or energy storage devices, such that a relocation of these variants into the pre-assembly of the respective floor module has a particularly advantageous effect on simplifying the main assembly line. Here, ergonomic advantages in the pre-assembly can particularly be obtained.

Furthermore, the production time within the main assembly line can be kept virtually constant, since the formation of variants takes place during pre-assembly.

The advantages cited presently in conjunction with the floor module according to the invention also apply to the method of the present invention. Here, the method according to the present invention is furthermore particularly distinguished by the fact that the floor module is connected to the chassis and the drive train before being arranged on the shell of the motor vehicle. It is hereby particularly possible to advance the formation of variants into the pre-assembly in a particularly advantageous manner, such that the shell of the motor vehicle can be produced at least to the greatest extent possible without variants.

A further advantage is that, at corresponding interfaces, constructional units of the floor module can already be connected to corresponding constructional units on the sides of the chassis and the drive train. Thus, it is possible, for example, to connect corresponding lines on sides of the floor module to corresponding lines on sides of the chassis or drive train. Furthermore, corresponding function tests, which entail an interaction of the constructional units of the floor module, the chassis and the drive train involved, can already be carried out after the connection, before the actual connection to the shell of the motor vehicle takes place.

BRIEF DESCRIPTION OF THE DRAWING FIGURES

Further advantages, features and details of the invention arise from the following description of a preferred exemplary embodiment and by reference to the drawings; the following are shown.

DETAILED DESCRIPTION

Figure 1:
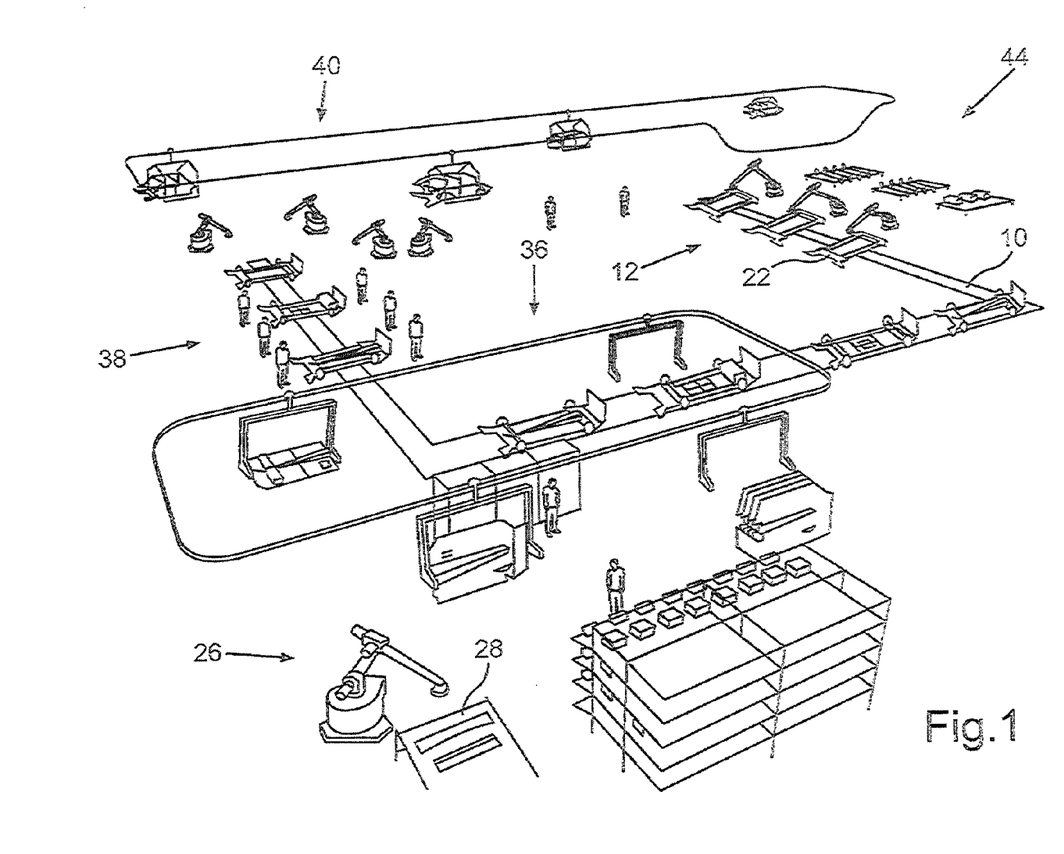
FIG. 1 a schematic perspective view onto an assembly line for the pre-assembly of a respective chassis and a respective drive train of the corresponding motor vehicle, as well as a floor module of the respective motor vehicle, which are connected to one another in line with a so-called "engagement" and pre-assembled before these are connected to a respective corresponding shell of the corresponding motor vehicle in line with a so-called "marriage", wherein the motor vehicle is equipped with wheels after the marriage.

FIG. 1 illustrates, in a schematic perspective view, an assembly line arranged upstream of a main assembly line (to be illustrated in greater detail) for the assembly of motor vehicles. This assembly line 10 is to be furthermore illustrated in detail in conjunction with FIGS. 2 to 7.

Figure 2:
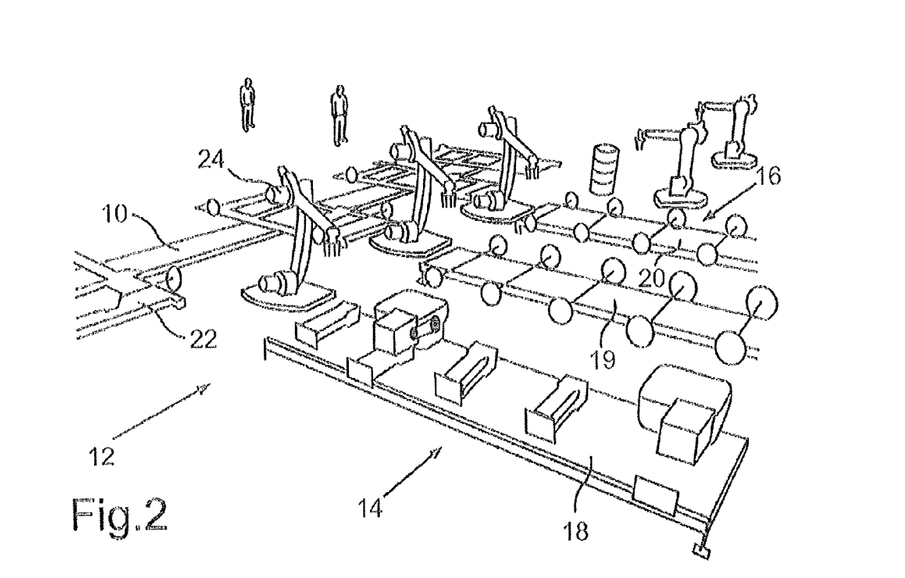
FIG. 2 a schematic perspective view onto the pre-assembly of the drive train and of the chassis within the assembly line shown in the FIG. 1.

First, in conjunction with FIG. 2, a first region 12 of the assembly line 10 can be seen, which shows the pre-assembly of a respective drive train 14 and a respective chassis 16 of the corresponding motor vehicle. Here, FIG. 2 shows the region 12 in a schematic and sectional perspective view.

As can be seen from FIG. 2, the region 12 of the assembly line 10 comprises a supply device 18 for a respective different drive or drive train 14, which is provided depending on the respective drive concept of the motor vehicle. Respective supply devices 19, 20 for a front axle or rear axle of the respective chassis 16 can be seen behind the supply device 18 for the respective drive or drive train 14. Moreover, further chassis elements or components can be provided as well as the front and rear axle.

As can now be seen from FIG. 2, the individual components of the drive train 14 and the chassis 16 are arranged on a respective auxiliary carrier 22, which is conveyed on the assembly line 10. This takes place by means of corresponding robots 24.

The respective components of the drive train 14 and the chassis 16 are provided in sequence on the supply devices 18 to 20 and positioned on the respective auxiliary carrier 22, which is allocated to a motor vehicle that is to be produced accordingly. The sequential arrangement and selection of the individual components of the drive train 14 and the chassis 16 thus take place depending on a respective drive concept of the motor vehicle.

Figure 3:
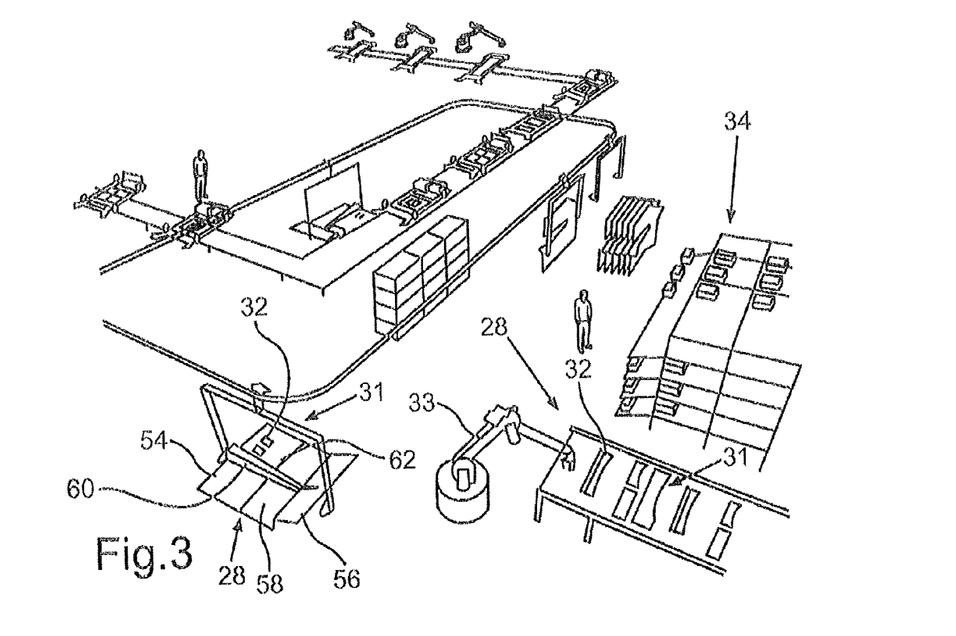
FIG. 3 a schematic perspective view onto a pre-assembly of the floor module within the assembly line according to FIG. 1.

In conjunction with FIG. 3, which in particular shows a second region 26 of the assembly line 10 in a further sectional and schematic perspective view, the pre-assembly of a floor module 28 becomes clear. This floor module 28 comprises a floor shell 30, on which a plurality of constructional units 32 can be arranged as equipment 31. These constructional units 32 are variant-specific or variant-dependent on the respective drive concept of the corresponding motor vehicle. Here, both individual components and constructional elements can be understood to be constructional units 32, as well as assemblies or structural groups. It is possible, for example, to add heat shields, hydraulic lines or fuel lines to the floor shell 30, which are preferably arranged on the underside of the floor shell 30. It is likewise possible to arrange air lines and cable harnesses to the floor shell 30, and indeed preferably on the upper side. Additionally, it is possible to add corresponding drive-concept-conditional energy storage devices, for example a tank, a battery or suchlike, to the floor shell 30. Corresponding control devices, which are required depending on the corresponding drive concept of the motor vehicle, can also be applied to the floor shell 30. Electrical constructional units 32 can also be fastened to the floor shell 30 in order to hereby complete the floor module 28.

The individual constructional units 32 are hereby applied to the floor shell 30 by means of a robot 33, for example. In the present case, a shelf 34 is depicted, on which the constructional units 32, for example, are provided in sequence.

Figure 4:
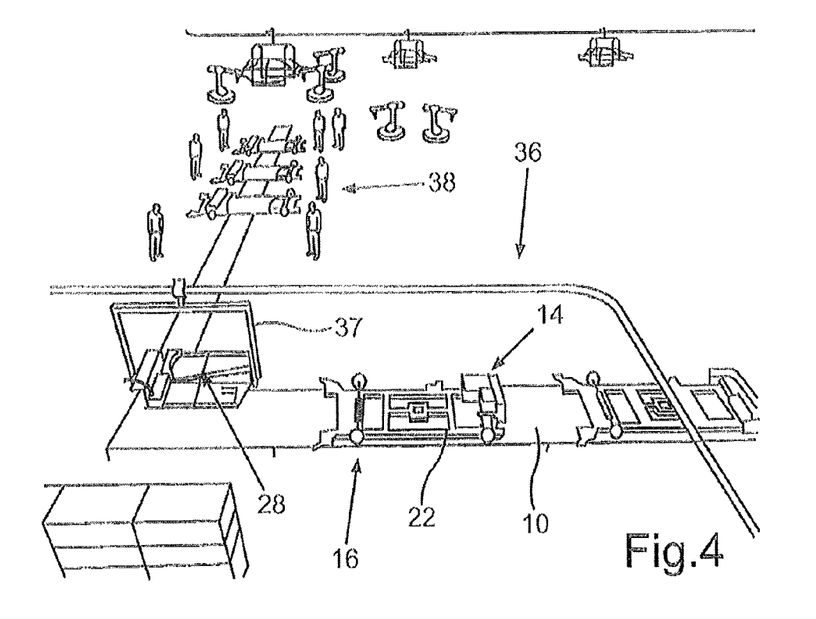
FIG. 4 a schematic perspective view onto the engagement of the chassis and the drive train with the respective floor module within the assembly line according to FIG. 1.

In conjunction with FIG. 4, a third region 36 of the assembly line 10 is depicted in a sectional and schematic perspective view. In this third region, there takes place a so-called engagement of the drive train 14 or chassis 16 pre-assembled in the first region 12 and the floor module 28 pre-assembled in the second region 26. Here, it can be seen that the auxiliary carrier 22 bearing the drive train 14 and the chassis 16 is introduced from below and the floor module 28 is fitted from above on the upper side via a corresponding transportation device 37. Thus, due to the engagement, a pre-assembled arrangement of drive train 14, chassis 16 and floor module 28 is achieved, which is attuned to the respective variant of the motor vehicle or to the respective drive concept of the motor vehicle.

Moreover, in FIG. 4, further assembly stations 38 can be seen, within which, for example, a connection of the corresponding components and constructional units 32 of the drive train 14, the chassis 16 and the floor module 28 can take place. As well as the connection of the individual components and constructional units 32, lines or energy storages devices such as tanks, for example, can be filled. Moreover, electrical control devices, for example, can be activated. After the engagement, the individual components or constructional units 32 are thus preferably ready for operation.

Figure 5:
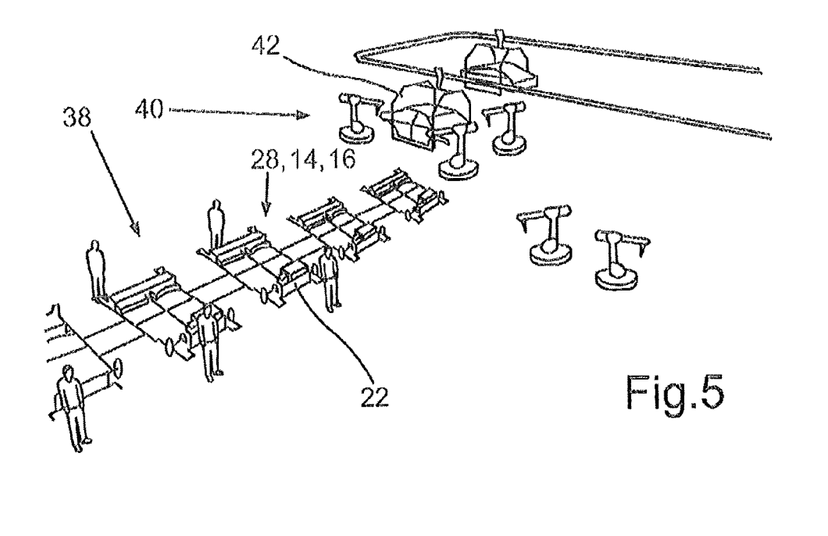
FIG. 5 a schematic perspective view onto the marriage of the respective shell of the motor vehicle with the respective chassis and drive train or the respective floor module within the assembly line according to FIG. 1.

A fourth region 40 of the assembly line 10 can be seen in FIG. 5, in which a respective shell 42, in line with a so-called marriage with its respective drive train 14, chassis 16 and floor module 28, which have first been combined with one another in the third region 36 in line with the engagement, is connected. To that end, the shell 42 has a corresponding recess for the floor module 28, which is applied accordingly. The drive train 14 and the chassis 16, as well as the floor module 28, are also connected to the shell 42 of the motor vehicle. After the connection to the shell 42, the auxiliary carrier 22, which has served to bear the drive train 14, the chassis 16 and the floor module 28, is conveyed back to the first region 12. At this point, it is to be noted that the present shell 42 is a self-supporting body of a personal motor vehicle or a self-supporting structure of a motor vehicle in general.

Since, as has already been illustrated, the respective variant of the drive concept takes place by the corresponding formation of the drive train 14, the chassis 16 and the floor module 28, the shell 42 is substantially configured without variants. This means that the variation that is necessary based on the drive concept is at least substantially pre-displaced into the pre-assembly of the drive train 14, the chassis 16 and the floor module 28.

Here, the floor shell 30 has corresponding interfaces as seen from the front and rear in the vehicle longitudinal direction, such that this can be fastened at the front to a pedal floor or a front wall, for example, or at the back to a corresponding region of the rear part.

Figure 6:
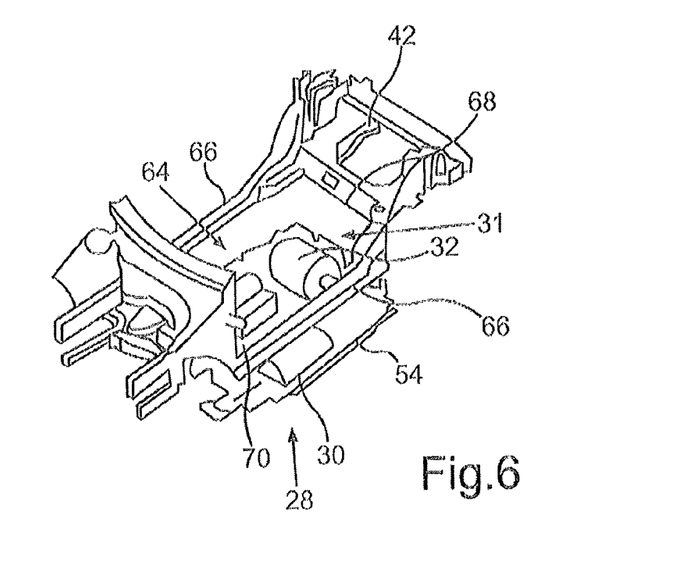
FIG. 6 a schematic perspective view onto a potential embodiment of the floor module and the shell of the motor vehicle with a corresponding receiver opening, in the region of which the floor module is arranged.

In conjunction with FIG. 6, which shows a schematic perspective view onto a potential embodiment of the floor module 28 and the shell 42 of the motor vehicle, it can be seen in which way the floor module 28 can be introduced into a corresponding receiver opening 64 of the shell 42 after having the equipment 31 applied to it. The receiver opening 64 here is essentially formed by corresponding side skirting elements 66 and moved forwards and backwards by corresponding carrier elements 68, 70, such that a frame-like receiver opening 64 arises. The side skirting elements 66 can here, if necessary, be completed by corresponding side skirting elements 66 on sides of the floor shell 30.

Moreover, it can be seen from FIG. 6 that, presently, only one part of the shell 42 of the motor vehicle body is shown. This part can have a corresponding attachment, for example a roof module, added to it accordingly before or after the marriage.

The corresponding lines, cables or suchlike, which are laid on the floor module 28, can be connected to interfaces on sides of the shell 42 or on sides of the drive train 14 or the chassis 16 in a simple manner. Thus, expensive packaging and relocation can be dispensed with.

Figure 7:
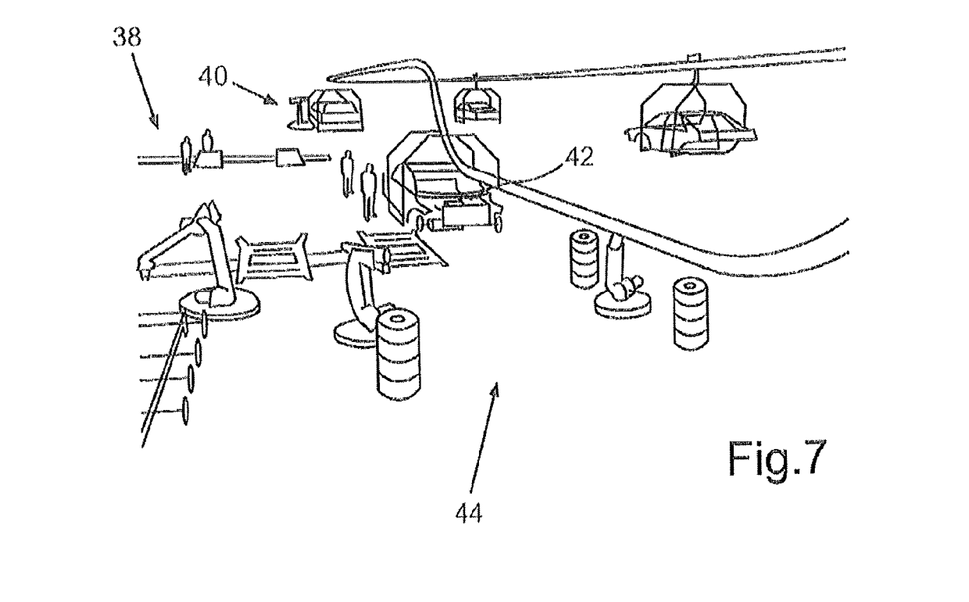
FIG. 7 a schematic perspective view onto an assembly station of the assembly line according to FIG. 1 after the marriage, within which the motor vehicle is equipped with the vehicle wheels.

FIG. 7 shows a further assembly station 44 of the assembly line 10, wherein the motor vehicle has motor vehicle wheels added to it. This has the particular advantage that conveyance and transportation devices, which must receive and/or bear the weight of the motor vehicle, can thus be dispensed with. In fact, the vehicle can be rolled off from this assembly station 44 due to the further assembly, in particular the main assembly line that is still to be illustrated further below. This can either take place as operated by external power or by the drive of the motor vehicle itself.

Figure 8:
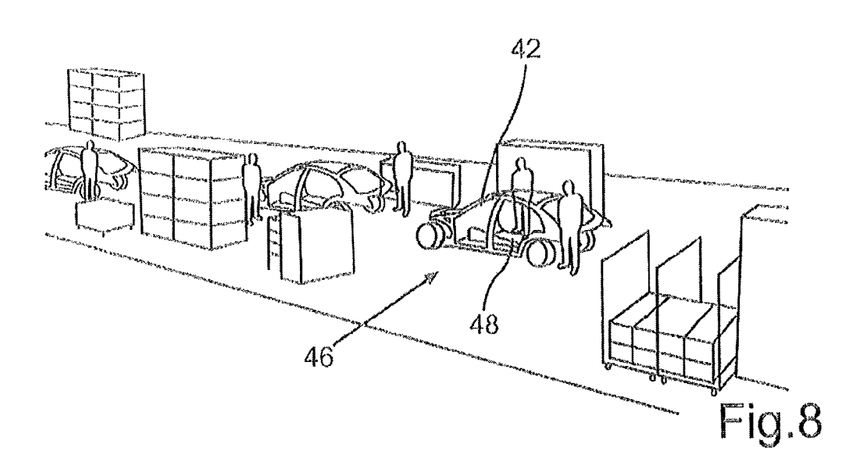
FIG. 8 a schematic perspective view onto assembly stations of a main assembly line located downstream of the assembly line according to FIG. 1, in which the respective shell of the motor vehicle is equipped with the interior installation.
Figure 9:
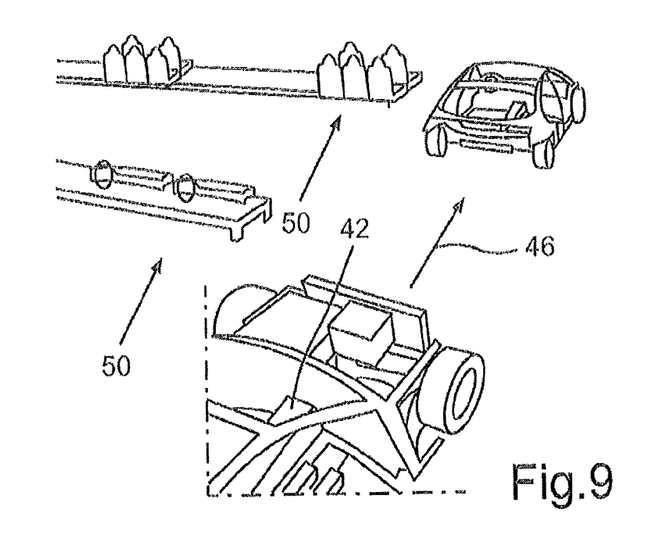
FIG. 9 a further sectional perspective view onto respective assembly stations of the main assembly line, within which respective constructional units and components of the interior installation are provided for the assembly; and in FIG. 10 a perspective view onto the respective shell of the motor vehicle, which has the chassis, drive train and interior installation added to it, which, in connection to the interior installation, has the elements forming the outer skin added to it.

FIGS. 8 and 9 show respective perspective views of a main assembly line 46, which is connected to the assembly line 10. By contrast to the hitherto existing assembly method, the equipping of the shell 42 with an interior installation 48 first takes place after the marriage. This interior installation 48 in particular comprises the installation of the dashboard, the seating units, the interior trim, the central console and a plurality of further devices such as the pedals, the steering column or other further equipment. For this, FIG. 8 shows respective assembly stations 50, wherein, for example, corresponding seating units or dashboards are assembled. Moreover, FIG. 7 shows that, for example, the displacement of the shell 42 can take place in the main assembly line 46.

Figure 10:
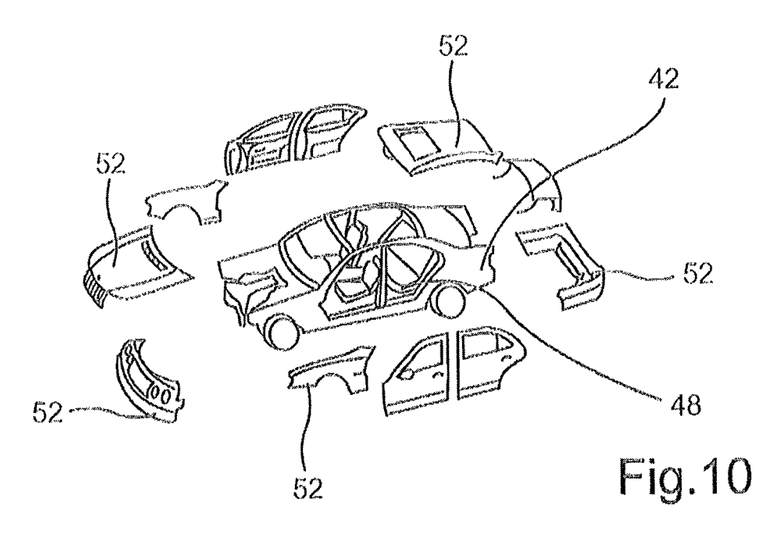

Finally, FIG. 10 shows the shell 42 of the motor vehicle in a schematic perspective view, wherein the interior installation 48 has already been implemented. It can be seen that, as well as the interior installation 48, the front windscreen and rear windscreen have also been adjusted. However, these can also be incorporated in a later production stage together with the outer skin.

In a further method procedure within the main assembly line 46, the shell 42 of the motor vehicle has a plurality elements 52 added to it after the interior installation 48 has been equipped, which form the outer skin of the motor vehicle. These elements can be moveable doors or hoods or flap, as well as other external covering parts such as mud guards, roof modules, front and rear-end modules or other external attachment parts. Here, the motor vehicle is preferably designed in such a way that the entire shell 42 is covered with corresponding external covering elements 52. This has the advantage that the shell 42 only has to have corrosion protection added to it before it is delivered to the marriage, and not a coating. This can be saved, since all regions are non-visible parts and are covered by the external covering elements 52.

The adjustment of functional elements of the motor vehicle can be preferably take place within the main assembly line 46, and therefore in particular to reduce the volumes in the region of the end of the main assembly line 46. Thus, for example, a chassis adjustment, a headlight adjustment or a calibration and start operation of driver assistance systems, in particular chassis assistance systems, can be displaced from the main assembly line 44 to the pre-assembly. Thus, for example, corresponding adjustments of functional elements in connection with the engagement and before or after the marriage can be monitored in the region of the pre-assembly and before the main assembly line 46. Likewise, due to the possibility for autonomous movement of the motor vehicle, it is possible for this to be moved onto corresponding chassis dynamometers or into regions for rain testing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A floor module for a motor vehicle, comprising:
    a floor shell configured for fastening to a shell of the motor vehicle; and variant-specific constructional units arranged on the floor shell,
wherein the floor module is configured in such a way that the shell of the motor vehicle forms a self-supporting body even without the floor shell, the floor module is configured for connection to a chassis of the motor vehicle, and a plurality of the constructional units are arranged on the floor shell depending on a drive concept of the corresponding motor vehicle.

2. The floor module according to claim 1, wherein at least one of the variant-specific constructional unit is a unit that stores energy or guides material and information flows.

3. The floor module according to claim 1, wherein the floor shell is a floor plate in the region of a main floor of a rear part, which can be introduced into an opening provided within the shell of the motor vehicle.

4. A method for assembling a floor module for a motor vehicle comprising a floor shell, the method comprising:
determining a drive concept of the motor vehicle;
arranging a plurality of constructional units on the floor shell depending on the determined drive concept of the motor vehicle; and
moving the assembled floor module to another assembly line for connection to a drive train selected for the drive concept and chassis,
wherein a shell of the motor vehicle forms a self-supporting body even without the floor shell.

5. The method according to claim 4, wherein one of the plurality of constructional units is a vehicle variant-specific constructional unit that is a unit that stores energy or guides material and information flows.

6. A method for the assembly of motor vehicles, the method comprising:
determining a drive concept of a motor vehicle;
forming a floor module by arranging a plurality of constructional units on a floor shell of the floor module depending on the determined drive concept of the motor vehicle;
arranging a drive train, which is selected based on the determined drive concept, and a chassis on a carrier;
joining the floor module with the drive train and chassis on the carrier; and
joining a shell of the motor vehicle with the floor module having the chassis and drive train,
wherein the shell of the motor vehicle forms a self-supporting body even without the floor shell.

7. The method of claim 6, wherein the combination of the floor module, drive train, and chassis are arranged on the carrier when joining with the shell of the motor vehicle.

8. The method of claim 6, wherein an interior installation of the shell of the motor vehicle first takes place after the joining of the shell and the floor module.

9. The method of claim 8, wherein the interior installation comprises a dashboard, seating units, interior trim, center console, pedals, or steering column.

10. The method of claim 8, wherein a plurality of elements forming an outer skin of the motor vehicle are applied to the shell after the interior installation.

* * * * *